US006322807B1

(12) United States Patent
van Ooyen

(10) Patent No.: US 6,322,807 B1
(45) Date of Patent: *Nov. 27, 2001

(54) BIOCIDAL COMPOSITIONS

(75) Inventor: Johannes Adrianus Cornelius van Ooyen, Giessenburg (NL)

(73) Assignee: DSM N.V., Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/704,085

(22) Filed: Aug. 28, 1996

Related U.S. Application Data

(63) Continuation-in-part of application No. 08/444,837, filed on May 18, 1995, now Pat. No. 5,562,916.

(30) Foreign Application Priority Data

May 27, 1994 (GB) ........................................ 10705
Jun. 18, 1994 (GB) ........................................ 12295

(51) Int. Cl.⁷ ................................................. A61K 31/385
(52) U.S. Cl. ........................................... 424/442; 514/568
(58) Field of Search ............................ 424/442; 514/568

(56) References Cited

U.S. PATENT DOCUMENTS

| 3,989,498 | 11/1976 | Cox ........................................... 71/3 |
| 4,405,354 | 9/1983 | Thomas et al. .......................... 71/21 |
| 5,562,916 | * 10/1996 | Van Ooijen ......................... 424/442 |
| 5,603,945 | 2/1997 | Isobe et al. . |

FOREIGN PATENT DOCUMENTS

| 1703028 | 1/1992 | (CH) . |
| 0683985A1 | 11/1995 | (EP) . |
| 1535233 | 12/1978 | (GB) . |
| 2008381A | 6/1979 | (GB) . |
| 2109217A | 6/1983 | (GB) . |
| 52-112571 | 9/1977 | (JP) . |
| 58-187149 | 11/1983 | (JP) . |
| 85015331 | 4/1985 | (JP) . |
| 62096046 | 5/1985 | (JP) . |
| 62-096046 | 5/1987 | (JP) . |
| 91034905 | 2/1991 | (JP) . |
| WO 93/16611 | 9/1993 | (WO) . |
| WO 96/24247 | 8/1996 | (WO) . |
| WO 96/24248 | 8/1996 | (WO) . |

OTHER PUBLICATIONS

CA abstract, 104:50274 (Deetz, L.E. et al.), 1985.*
Proceedings 1993 Cornell Nutrition Conference for Feed Manufactures, 1993, 55th Ithaca, N.Y. pp. 130–143.
Keshavaraz K.; et al, 'The Effect of Acidogenic Salts on Acid–Base Balance and Eggshell Quality in Laying Hens'.
Keshavarz, Poultry Science, vol. 70 (1991) pp. 1723–1731.
Keshavarz, Proc. 1993, Cornell Nutrition Conf., pp. 19–32.
Abstract of JP 07228533, Dialog File: Derwent WPI.
Abstract of JP 06298641, Dialog File: Derwent WPI.

* cited by examiner

Primary Examiner—Neil S. Levy
(74) Attorney, Agent, or Firm—Pillsbury Winthrop LLP

(57) ABSTRACT

This invention relates to a composition comprising benzoic acid or a derivative of benzoic acid capable of giving rise to free benzoic acid in vivo for use as a medicament for animals, wherein said acid/salt functions as an antibiotic, promotes growth, decreases feed conversion and improves digestibility of amino acids administered in animal feeds.

10 Claims, No Drawings

BIOCIDAL COMPOSITIONS

This application is a continuation-in-part of application Ser. No. 444,837 filed May 18, 1995, now U.S. Pat. No. 5,562,916 issued on Oct. 8, 1996.

This invention relates to the use of compositions comprising benzoic acid for use as a medicament for animals, especially pigs, at the same time promoting growth thereof and improving the digestibility of amino acids fed to such animals.

It is known from our own prior published EP-A-0683985 that animal feed compositions comprising benzoic acid or salts thereof can be used to minimise the emission of odoriferous ammonia from organic wastes, especially animal excrements and manure.

It has now been found that in addition to the above function, benzoic acid can be used instead of relatively expensive antibiotics for such animals and furthermore, such acid/salts have the advantage of being able to promote growth, decrease feed conversion and improve digestibility of amino acids in animal feeds.

Accordingly, the present invention is a composition comprising benzoic acid or a derivative of benzoic acid capable of giving rise to free benzoic acid in vivo for use as a medicament for animals, wherein said acid/salt functions as an antibiotic, promotes growth, decreases feed conversion and improves digestibility of amino acids administered in animal feeds.

Benzoic acid or a derivative thereof capable of giving rise to benzoic acid in vivo may be administered to the animals as a component of a composition which is conventionally fed to animals. Thus, benzoic acid and derivatives thereof may be suitably administered to the animals as a component of the animal feed or in their drinking water. Specific examples of derivatives of benzoic acid which can give rise to benzoic acid in vivo include salts of benzoic acid such as eg the alkali metal-alkaline earth metal- and ammonium benzoates.

The amount of benzoic acid or a derivative thereof administered to the animal is suitably such that it is sufficient to prevent/cure any infection in the animal in its capacity as a biocide. Such an amount is suitably in the range from 0.001–5% based on the total weight of each feed fed to the animal. This amount may, however, be higher if the function of benzoic acid or a derivative thereof is no only to act as a biocide but also to control the pH of the animal excreta fed on such a diet in order to suppress the emission of ammonia from the excreta. Such higher amounts are suitably limited to a maximum of about 10% based on the total animal feed composition.

A typical formulation for an animal feed composition is shown in Table 1 below in which all the amounts shown in % by weight were fed to pigs:

TABLE 1

| Composition | Control II | Example 1 |
|---|---|---|
| Meat meal (58% Crude protein) | 3.20 | 3.20 |
| Molasses | 5.00 | 5.00 |
| Wheat | 5.90 | 5.90 |
| Soybean meal (45% Crude protein) | 15.1 | 15.1 |
| Tapioca (66% starch) | 36.5 | 35.5 |
| Wheat middlings | 15 | 15 |
| Animal fat | 3.3 | 3.3 |
| Limestone | 0.74 | 0.74 |
| Lysine hydrochloride (98%) | 0.06 | 0.06 |

TABLE 1-continued

| Composition | Control II | Example 1 |
|---|---|---|
| Vitamin premix | 0.5 | 0.5 |
| Trace minerals | 0.5 | 0.5 |
| Sunflower meal | 12.2 | 12.2 |
| Ammonium chloride | 2 | 2 |
| Ammonium benzoate | — | 1 |

Thus, benzoic acid or a derivative thereof may be used in combination with conventional ingredients present in an animal feed composition (diet) such as calcium carbonates, electrolytes such as eg ammonium chloride, proteins such as soya bean meal, wheat, starch, sunflower meal, corn, meat and bone meal, amino acids, animal fat, vitamins and trace minerals.

In such a composition, the ratio of the electrolyte to the benzoic acid or a derivative thereof is suitably in the range from 0.5:1 to 5:1 w/w, preferably from 1.5:1 to 3:1 w/w.

Benzoic acid or a derivative thereof is particularly effective as a medicament for animals such as poultry, pigs or cattle, especially pigs.

The present invention is further illustrated with reference to the following Examples:

EXAMPLE 1

The following feed compositions (shown in Table 2 below) in which all the amounts shown in % by weight were fed to pigs.

TABLE 2

| Composition | Control I | Control II | Example 1 |
|---|---|---|---|
| Meat meal (58% Crude protein) | 3.20 | 3.20 | 3.20 |
| Molasses | 5.00 | 5.00 | 5.00 |
| Wheat | 5.90 | 5.90 | 5.90 |
| Soybean meal (45% Crude protein) | 15.1 | 15.1 | 15.1 |
| Tapioca (66% starch) | 38.5 | 36.5 | 35.5 |
| Wheat middlings | 15 | 15 | 15 |
| Animal fat | 3.3 | 3.3 | 3.3 |
| Limestone | 0.74 | 0.74 | 0.74 |
| Lysine hydrochloride (98%) | 0.06 | 0.06 | 0.06 |
| Vitamin premix | 0.5 | 0.5 | 0.5 |
| Trace minerals | 0.5 | 0.5 | 0.5 |
| Sunflower meal | 12.2 | 12.2 | 12.2 |
| Ammonium chloride | — | 2 | 2 |
| Ammonium benzoate | — | — | 1 |

The pH of the urine of the pigs fed on these diets for two days was monitored over various durations and found to be as follows (see Table 3 below):

TABLE 3

| Duration | Control I - pH | Coutrol II - pH | Example 2 - pH |
|---|---|---|---|
| After 0 Days* | 8.15 | 5.22 | 4.68 |
| After 7 days | 8.30 | 8.57 | 5.01 |
| After 10 days | 8.30 | 8.60 | 6.92 |

*First excretion by the pigs after the two day feeding stage.

From these results it is abundantly clear that the use of the additives of the present invention gives rise to excrements of highly acidic and stable pH values and consequently gives rise to little or no ammonia emissions.

EXAMPLE 2

In a further comparative test, a number of pigs were fed with a standard feed as shown below in Table 4. This was repeated in Example 2 except that 0.7% wt. of the wheat middlings in the standard feed was replaced with benzoic acid. The results are shown in Table 5 below:

TABLE 4

| Composition | Weight % |
|---|---|
| Barley | 36.15 |
| Wheat | 30 |
| Peas | 3.5 |
| Rape seed oil meal | 3 |
| Soyabean oil meal (Brazilian) | 17 |
| Wheat middlings | 2.5* |
| Animal fat | 1.9 |
| Limestone | 0.61 |
| Lysine hydrochloride (98%) | 0.18 |
| Vitamin premix | 1 |
| Molasses | 3.4 |
| Methionine | 0.11 |
| Mono-calcium phosphate | 0.4 |
| Salt | 0.25 |

TABLE 5

| Variables | Example 2* | Comparative Test |
|---|---|---|
| No. of pigs fed | 33 | 33 |
| Starting wt. per pig (Kg) | 23.8 | 23.0 |
| Final wt. per pig (Kg) | 40 | 40.3 |
| Growth per pig per day (g) | 577 | 588 |
| Feed conversion | 1.91 | 211 |
| Feed intake (Kg) | 1.104 | 1.239 |

*0.7% wt of the wheat middlings in the standard feed replaced by benzoic acid.

The above results show that pigs fed with a diet comprising benzoic acid have a much lower feed conversion (calculated as a ratio of feed intake over growth per pig per day) than those fed on a diet free of such benzoic acid. This signifies that the feed to the pigs is being used more efficiently.

I claim:

1. A method of promoting growth, decreasing feed conversion or improving digestibility of amino acids in an animal which comprises administering to said animal a composition comprising an amount of benzoic acid or a derivative of benzoic acid giving rise to benzoic acid in vivo effective to promote growth, decrease feed conversion or improve digestibility of amino acids in said animal.

2. A method according to claim 1 wherein said composition containing benzoic acid or a derivative thereof capable of giving rise to benzoic acid in vivo is administered to the animals as a component of an animal feed.

3. A method according to claim 1 wherein said composition containing benzoic acid or a derivative thereof is administered to the animal as a component of the drinking water fed to the animal.

4. A method according to claim 1 wherein the derivative of benzoic acid capable of giving rise to benzoic acid in vivo is selected from the group consisting of alkali metal benzoates, alkaline earth metal benzoates and ammonium benzoate.

5. A method according to claim 2, wherein said animal feed comprises calcium carbonate, an electrolyte, protein, wheat, starch, sunflower meal, corn, meat, bon meal, amino acids, fat, vitamins and trace minerals.

6. A method according to claim 1 wherein the amount of said composition containing benzoic acid or a derivative thereof administered to the animal is in the range from 0.001–5% based on the total weight of each feed fed to the animal.

7. A method according to claim 5, wherein the ratio of the electrolyte to the benzoic acid or a derivative thereof in the animal feed is in the range of from 0.5:1 to 5:1 w/w.

8. A method of treating an animal according to claim 1, wherein an antibiotic amount of benzoic acid or a derivative of benzoic acid giving rise to benzoic acid in vivo is administered to said animal.

9. A method for curing infection in animals in need of such curing comprising administering to said animal a composition comprising an amount of benzoic acid or a derivative of benzoic acid giving rise tobenzoic acid in vivo effective to act as an antibiotic.

10. A method according to claim 9 wherein said composition containing the amount of benzoic acid or a derivative thereof administered to the animal is in the range from 1–5% based on the total weight of each feed fed to the animal.

* * * * *